United States Patent
Goldberg et al.

(10) Patent No.: US 6,223,156 B1
(45) Date of Patent: *Apr. 24, 2001

(54) SPEECH RECOGNITION OF CALLER IDENTIFIERS USING LOCATION INFORMATION

(75) Inventors: Randy G. Goldberg, Princeton; Roy Philip Weber, Bridgewater, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/056,172

(22) Filed: Apr. 7, 1998

(51) Int. Cl.[7] .............................. G10L 17/00; H04M 1/64
(52) U.S. Cl. .................... 704/247; 704/240; 704/252; 379/88.01; 379/88.19; 379/88.2
(58) Field of Search .............................. 379/88.01, 88.02, 379/88.19, 88.2; 704/231, 239, 240, 246, 247, 251, 252

(56) References Cited

U.S. PATENT DOCUMENTS

| | | | |
|---|---|---|---|
| 4,783,803 | * 11/1988 | Baker et al. ........................ | 704/252 |
| 4,829,577 | * 5/1989 | Kuroda et al. ...................... | 704/244 |
| 5,255,183 | * 10/1993 | Katz ...................................... | 705/30 |
| 5,274,695 | * 12/1993 | Green .................................. | 379/88.2 |
| 5,524,169 | 6/1996 | Cohen et al. ........................ | 395/2.4 |
| 5,608,784 | * 3/1997 | Miller .................................. | 379/88.2 |
| 5,625,680 | * 4/1997 | Foladare et al. .................... | 379/199 |
| 5,867,562 | * 2/1999 | Scherer ................................ | 379/112 |
| 5,895,466 | * 4/1999 | Goldberg et al. ....................... | 707/5 |
| 5,896,445 | * 4/1999 | Key et al. ............................. | 379/135 |
| 6,058,364 | * 5/2000 | Goldberg et al. ..................... | 704/252 |

* cited by examiner

Primary Examiner—William R. Korzuch
Assistant Examiner—Abul K. Azad

(57) ABSTRACT

A speech recognition system recognizes a caller identifier received during a telephone call as a speech signal from a caller. The system generates a plurality of caller identifier choices from the speech signal and receives location information of the caller. The system includes a database on which is stored a plurality of caller identifiers indexed to a plurality of location information. The system queries a database based on the received location information and retrieves one or more caller identifiers from the database. The system then selects the recognized caller identifier from the plurality of caller identifier choices based on the retrieved one or more caller identifiers.

23 Claims, 2 Drawing Sheets

SPEECH RECOGNITION OF CALLER IDENTIFIERS USING LOCATION INFORMATION

FIELD OF THE INVENTION

The present invention is directed to speech recognition. More particularly, the present invention is directed to speech recognition of a caller identifier using location information.

BACKGROUND OF THE INVENTION

Many institutions, such as banks and airlines, allow customers and other callers to access over the telephone a wide variety of services and account information. Before the advent of touch-tone telephones, a caller would obtain these services and information through interacting with a live operator. As touch-tone telephones became more prevalent in homes, these institutions began switching to automated caller-access systems. After dialing a telephone number, a caller using such systems would be asked to enter an identifier or confirmation number. An identifier typically comprises a string of alphanumeric characters.

When using touch-tone phones with an automated caller-access system, a caller can enter an identifier by sequentially pressing a series of keys provided on the telephone keypad. Each pressed key corresponds to a different character in the identifier. The pressing of these keys produces a series of tones that are provided over a telephone network to the institution. At the institution, the series of tones are decoded to produce the entered identifier, and if the identifier entered by the caller is determined to correspond to a valid identifier, then the caller is allowed to enter commands, again through the telephone keypad, that provide access to whatever services are offered by the institution.

Recently, automated caller-access systems have eliminated the use of telephone keypads to obtain the identity of a valid caller. Instead of entering an identifier through a telephone keypad, a caller is prompted to speak the identifier into the telephone handset. For example, the caller may speak into the telephone the identifier "JB123E". The caller's voice signal is transmitted over the phone lines to the institution, which employs a speech recognition system to produce a recognized identifier that is intended to correspond exactly to the identifier spoken by the caller.

However, such exact correspondence is difficult to attain due to, for example, the deterioration of voice signals that routinely occurs over conventional telephone lines, and the different ways the same words are pronounced by different users. Because of these problems, the speech recognizer may confuse similar sounding letters and numbers. Thus, a speech recognizer may confuse the letter "A" with the number "8", the letter "K", or the letter "J". Similarly, the speech recognizer may confuse the letter "C" with the letter "D" or the number "3". For example, given that a caller speaks the identifier "JB123E" into a telephone, the speech recognizer may produce "AE123D" as an output.

In order to compensate for inaccuracies, many speech recognition systems used by businesses must request that a caller pronounce the word multiple times, or be subject to various confirmation routines. This can be time consuming and frustrating to the caller.

Based on the foregoing, there is a need for a speech recognition system that has an increased caller identifier recognition accuracy compared to known speech recognition systems.

SUMMARY OF THE INVENTION

The present invention is a speech recognition system for recognizing a caller identifier received during a telephone call as a speech signal from a caller. The system generates a plurality of caller identifier choices from the speech signal and receives location information of the caller. The system includes a database on which is stored a plurality of caller identifiers indexed to a plurality of location information. The system queries a database based on the received location information and retrieves one or more caller identifiers from the database. The system then selects the recognized caller identifier from the plurality of caller identifier choices based on the retrieved one or more caller identifiers.

DETAILED DESCRIPTION

Figure 1:
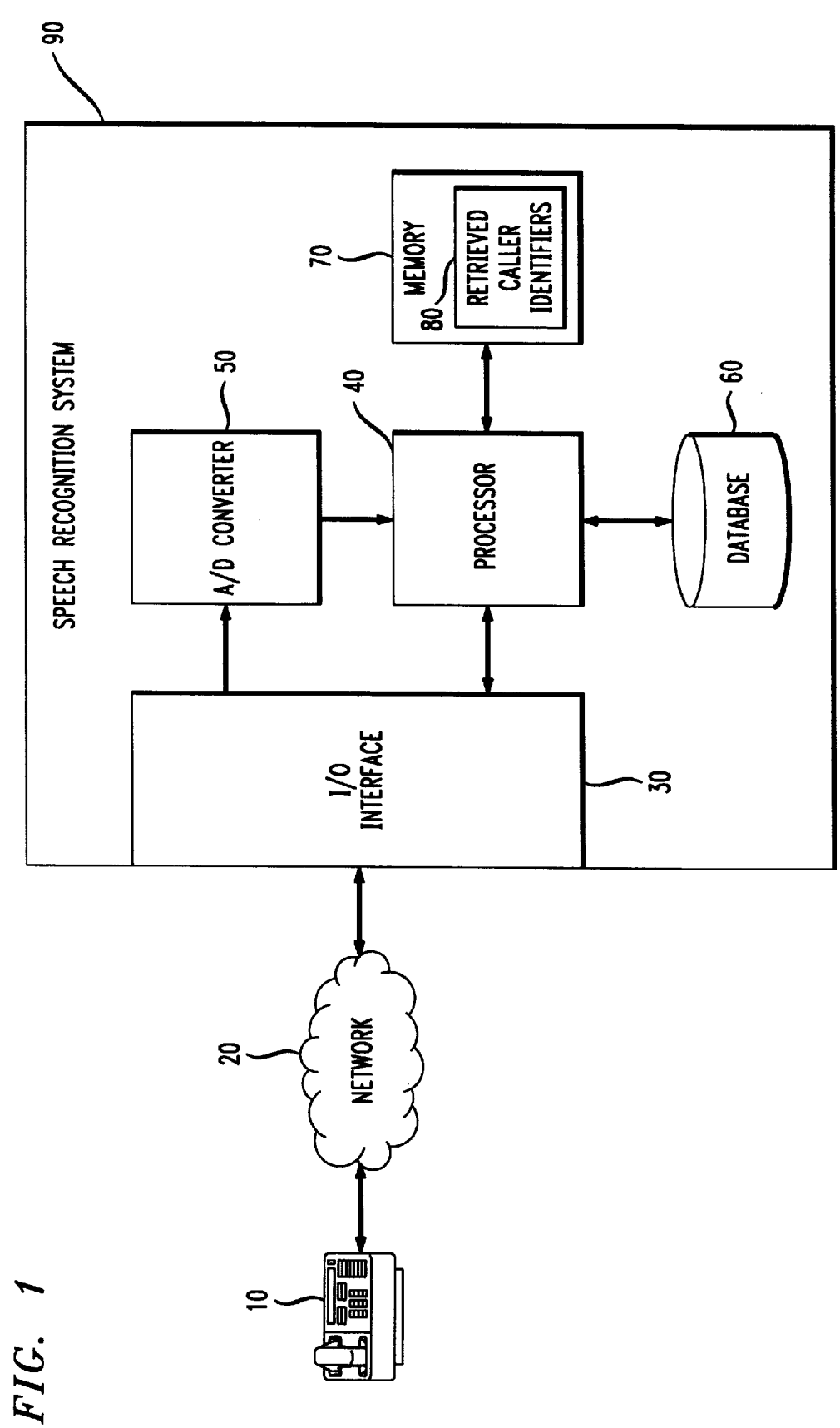
FIG. 1 is a block diagram illustrating a speech recognition system in accordance with one embodiment of the present invention.

One embodiment of the present invention is a speech recognition system for recognizing customer or caller identifiers that uses the location of the caller to enhance the recognition accuracy. FIG. 1 is a block diagram illustrating a speech recognition system 90 in accordance with one embodiment of the present invention.

Speech recognition system 90 includes an I/O interface 30. I/O interface 30 interfaces system 90 to a user. In the embodiment shown in FIG. 1, I/O interface 30 is coupled through a network 20 to a telephone 10. Telephone 10 enables a user of system 90 to access system 90 by participating in a telephone call between telephone 10 and system 90. The user can transmit a speech signal to system 90 through telephone 10 as well as receive signals from system 90. Network 20 can be any network that enables the user at telephone 10 to dial a telephone number associated with system 90. For example, network 20 can be the Public Switched Telephone Network ("PSTN"), a local area network, the Internet, or an intranet.

Speech recognition system 90 further includes a processor 40 and an analog-to-digital ("A/D") converter 50 coupled to I/O interface 30. Processor 40 is programmed to execute the steps of the invention that are described in detail in conjunction with FIG. 2. A/D converter 50 converts analog speech signals received from I/O interface 30 into digital signals that are received by processor 40. Processor 40 is coupled to a database 60 and a memory device 70. Memory device stores retrieved caller identifiers 80 which are one or more caller identifiers that are retrieved from database 60.

Processor 40, in combination with A/D converter 50, is also programmed with known speech processing software to receive a speech signal generated from human utterances and generates multiple choices of words (referred to as "caller identifier choices" for the purpose of this patent) that represent the utterances. In one embodiment, for each caller identifier choice, a probability that the caller identifier choice is the correct caller identifier choice is also generated by the speech recognition software.

In one embodiment, processor 40 utilizes a Hidden Markov Model to generate a list of "N-best" choices. An example of this method of speech recognition is disclosed in U.S. Pat. No. 5,241,619, herein incorporated by reference. In another embodiment, processor 40 executes post-processing routines to generate multiple choices and associated probabilities for each choice. One example of such a post-processing routine is disclosed in U.S. patent application Ser. No. 08/763,382, filed on Dec. 13, 1996 and entitled "Statistical Database Correction of Alphanumeric Account Numbers for Speech Recognition and Touch-Tone Recognition". Further, other known methods can be used by processor 40 to generate multiple caller identifier choices, and probabilities assigned to the caller identifier choices.

Speech processing system 90 is intended to be used by a business that has a plurality of customers that perform transactions from telephone 10. In one embodiment, each customer or caller is assigned a caller identifier. The term "identifier" refers to a string of characters that may comprise a plurality of letters, numbers, or both. One example of a caller identifier is a six digit identifier such as ZX147K.

Database 60 stores the name of each customer, or caller of the business that uses speech processing system 90 and location information associated with each caller. In one embodiment, the location information includes the telephone number (e.g., the caller's home telephone number), street address and Zip code of the caller. Database 60 also stores a caller identifier for each caller. The caller identifiers stored in database 60 are indexed to the location information. Therefore, queries can be made of database 60 based on location information. For example, all caller identifiers that belong to callers having Zip code "20852" can be retrieved from database 60. Further, for example, all caller identifiers that belong to callers having an area code "301" can be retrieved from database 60.

Figure 2:
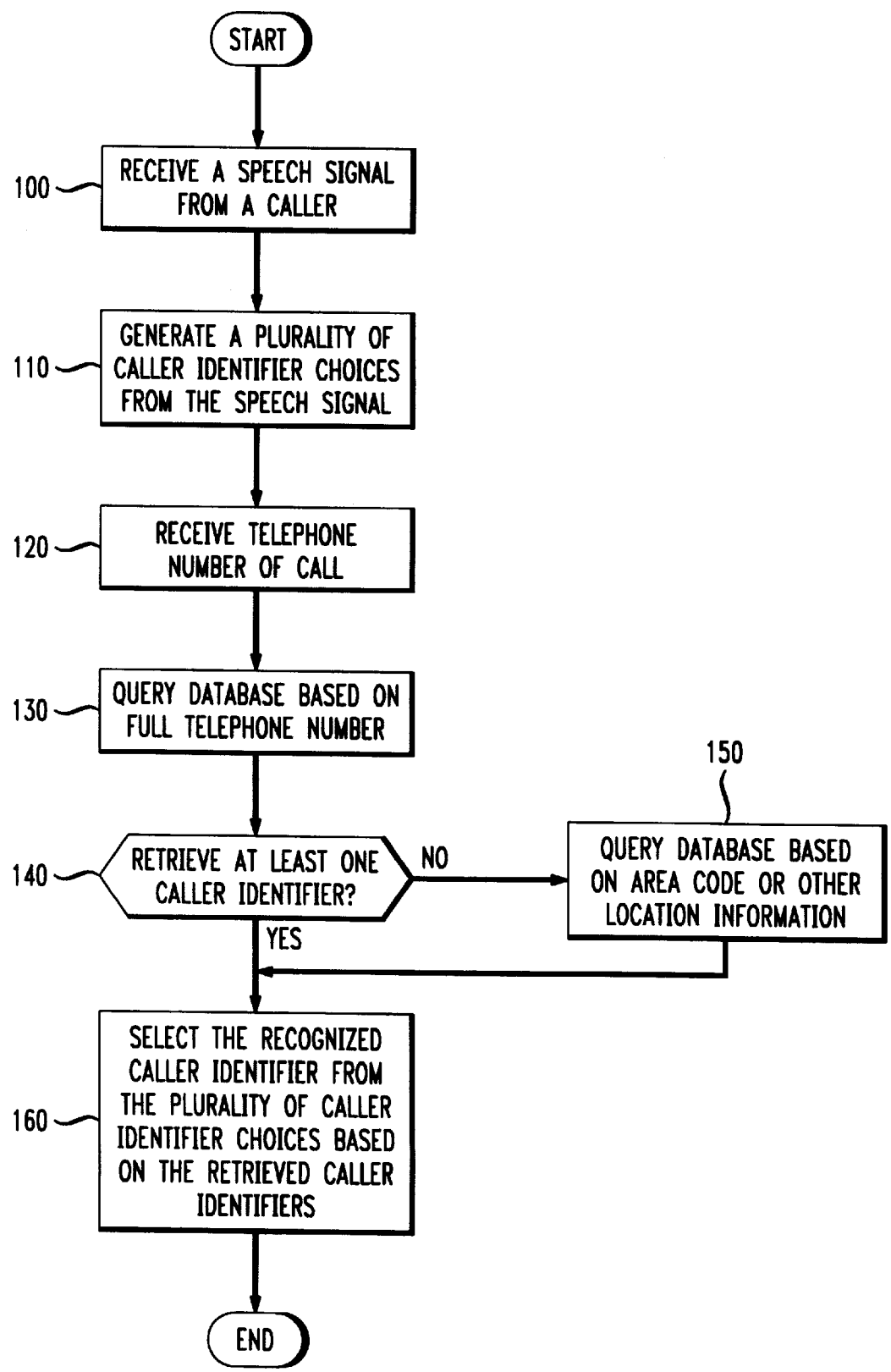
FIG. 2 is a flowchart illustrating some of the steps performed by one embodiment of the speech recognition system when recognizing a caller identifier received from a caller.

FIG. 2 is a flowchart illustrating some of the steps performed by one embodiment of speech recognition system 90 when recognizing a caller identifier received from a caller. In one embodiment, the steps are executed by processor 40 and stored as software in memory device 70. In other embodiments, the functions of the steps are performed using hardware, or a combination of hardware or software.

At step 100, a speech signal is received from the caller after the caller identifier is requested. The request can be in the form of a computer generated or recorded voice sent to the caller at telephone 10. For example, the request could be "Please say your caller identifier". The speech signal is generated by the caller's utterance in response to the request.

At step 110, system 90 generates a plurality of caller identifier choices based on the received speech signal. These choices are generated using the speech recognition hardware and software previously discussed. In one embodiment, associated with each choice is a probability as to whether that choice is the correct identifier.

At step 120, system 90 receives the telephone number that the caller is calling from, i.e., the telephone number associated with telephone 10. In one embodiment, system 90 receives the telephone number using an automatic number identification ("ANI") that is received with the telephone call. In other embodiment, other location information associated with the caller is received at step 120 (e.g., the caller's Zip code).

At step 130, database 60 is queried based on the telephone number received at step 120. If this telephone number matches a telephone number stored in database 60 (e.g., the caller is calling from home), then at least one caller identifier indexed to that telephone number will be retrieved from database 60. More than one caller may be retrieved from a single phone number because multiple identifiers may be indexed to the same caller identifier (e.g., each person in a family assigned the same telephone number has a different caller identifier). The retrieved caller identifiers are stored in memory 70 as retrieved caller identifiers 80.

At step 140, system 90 determines whether at least one caller identifier was retrieved at step 130. If no caller identifiers were retrieved, then the caller was calling from a phone number that is not stored in database 60. For example, the caller may be calling from a work number, and only home telephone numbers are store in database 60, or the caller may be calling from a pay phone.

If no caller identifiers were retrieved at step 140, at step 150 database 60 is again queried based on the area code of the telephone number received at step 120, or other location information. The other location information, such as the caller's Zip code or state of residence can be received by requesting the caller to say the information or having the caller enter the information using the telephone keypad. The retrieved caller identifiers from step 150 are stored in retrieved caller identifiers 80.

In the case of the query based on the area code, the retrieved caller identifiers have been assigned to callers in a similar geographic region as the telephone number received at 120. This can improve the recognition accuracy of system 90 because if a caller is not calling from their home telephone number, they are likely to be calling from a telephone number geographically close to their home. The other location information, such as the Zip code and the state of residence, will retrieve all caller identifier numbers that are assigned only to callers that live in the received Zip code or state. This will limit the number of possible caller identifiers that match the caller identifier spoken by the caller and will improve the accuracy of system 90.

At step 160, one of the caller identifier choices generated at step 110 is selected as the recognized caller identifier based on the caller identifiers retrieved at step 140 or step 150 and stored as retrieved caller identifiers 80. Retrieved caller identifiers 80 can be used in a variety of ways to improve the chances that the selected caller identifier choice is the correct caller identifier (i.e., the selected caller identifier choice matches the caller identifier spoken by the caller).

In one embodiment, processor 40 determines if any of the caller identifier choices match one of the retrieved caller identifiers 80. If there is a match, the matched caller identifier choice is selected as the recognized caller identifier. If there is not a match, in one embodiment none of the caller identifier choices are selected as the recognized caller identifier and the caller may be asked to repeat the word. In another embodiment, one of the unmatched caller identifier choices is selected using standard selection methods (e.g., selecting the caller identifier choice with the highest probability).

In another embodiment, the caller identifier choices are compared to retrieved caller identifiers 80 and the probabilities associated with each caller identifier choice are then modified based on whether each caller identifier choice matches one of the retrieved caller identifiers 80. For example, for each caller identifier choice that matches one of the retrieved caller identifiers 80, the probability associated with that caller identifier choice is tripled. One of the caller identifier choices is then selected using known methods of selecting the caller identifier choice with the highest probability. Other methods can be used to select one of the caller identifier choices based on retrieved caller identifiers 80.

As disclosed, the present invention utilizes location information to increase the recognition accuracy of a caller identifier. The location information can be directly extracted from the telephone call, as in the case of using ANI to receive the telephone number, or require additional input from the caller.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of recognizing a first caller identifier received during a telephone call, comprising:

receiving a speech signal from a caller;

generating a plurality of caller identifier choices from the speech signal;

receiving a first location information associated with the caller;

querying a database based on the first location information, the database having stored thereon a plurality of caller identifiers, and a plurality of location information, wherein each caller identifier is associated with at least one location information;

retrieving one or more caller identifiers from the database as a result of the query; and selecting the recognized first caller identifier based on the generated plurality of caller identifier choices and the retrieved one or more caller identifiers.

2. The method of claim 1, wherein the first location information comprises the telephone number from where the telephone call originated.

3. The method of claim 2, wherein the telephone number is received using automatic number identification.

4. The method of claim 2, wherein the step of querying a database based on the first location information comprises:

querying the database based on the telephone number;

determining whether the step of querying the database based on the telephone number will result in at least one caller identifier being retrieved; and querying the database based on an area code portion of the telephone number if the step of querying the database based on the telephone number will not result in at least one caller identifier being retrieved.

5. The method of claim 2, wherein the step of querying a database based on the first location information comprises:

querying the database based on the telephone number;

determining whether the step of querying the database based on the telephone number will result in at least one caller identifier being retrieved;

receiving a second location information associated with the caller if the step of querying the database based on the telephone number will not result in at least one caller identifier being retrieved; and querying the database based on the second location information.

6. The method of claim 5, wherein the second location information comprises a Zip code of the caller.

7. The method of claim 1, wherein the step of selecting the recognized first caller identifier comprises:

determining a match between said generated plurality of caller identifier choices and said retrieved one or more caller identifiers; and selecting the match as the recognized first caller identifier.

8. The method of claim 1, further comprising:

assigning probabilities to said generated plurality of caller identifier choices, wherein the step of selecting the recognized first caller identifier comprises:

comparing said generated plurality of caller identifier choices with said retrieved one or more caller identifiers; and modifying the probabilities based on the comparison.

9. A speech recognition system for recognizing a first caller identifier received during a telephone call, said system comprising:

means for receiving a speech signal from a caller;

means for generating a plurality of caller identifier choices from the speech signal;

means for receiving a first location information associated with the caller;

a database having stored thereon a plurality of caller identifiers, and a plurality of location information, wherein each caller identifier is associated with at least one location information;

means for querying said database based on the first location information;

means for retrieving one or more caller identifiers from the database; and means for selecting the recognized caller identifier based on the generated plurality of caller identifier choices and the retrieved one or more caller identifiers.

10. The system of claim 9, wherein the first location information comprises the telephone number from where the telephone call originated.

11. The system of claim 10, wherein the telephone number is received using automatic number identification.

12. The system of claim 9, wherein said means for selecting comprises:

means for determining a match between said generated plurality of caller identifier choices and said retrieved one or more caller identifiers; and means for selecting the match as the recognized caller identifier.

13. The system of claim 9, further comprising:

means for assigning probabilities to said generated plurality of caller identifier choices, wherein said means for selecting comprises the steps of:
means for comparing said generated plurality of caller identifier choices with said retrieved one or more caller identifiers; and means for modifying the probabilities based on the comparison.

14. A method of recognizing a first caller identifier received during a telephone call, comprising:

storing a plurality of caller identifiers and plurality of telephone numbers on a database, wherein each caller identifier is associated with at least telephone number;

receiving a speech signal during the telephone call;

receiving an originating telephone number of the telephone call;

generating a plurality of caller identifier choices from the speech signal;

querying the database based on the received telephone number;

retrieving one or more caller identifiers from the database as a result of the query; and selecting the recognized first caller identifier based on the generated plurality of caller identifier choices and the retrieved one or more caller identifiers.

15. The method of claim 14, wherein the telephone number comprises an area code and the database is queried using the area code.

16. The method of claim 14, wherein the telephone number is received using automatic number identification.

17. The method of claim 14, wherein the selecting step further comprises:

determining a match between said generated plurality of caller identifier choices and said retrieved one or more caller identifiers, and selecting the match as the recognized first caller identifier.

18. The method of claim 14, further comprising:

assigning probabilities to said generated plurality of caller identifier choices, wherein the recognized first caller identifier is selected by the steps of:

comparing said generated plurality of caller identifier choices with said retrieved one or more caller identifiers; and modifying the probabilities based on the comparison.

19. A speech recognition system connected to a network for recognizing a first caller identifier received during a telephone call, comprising:

a database having stored thereon a plurality of caller identifiers, and a plurality of location information, wherein each caller identifier is associated with at least one location information;

a processor that receives a speech signal from a caller through the network, generates a plurality of caller identifier choices from the speech signal, receives a first location information associated with the caller, queries the database based on the first location information, retrieves one or more caller identifiers from the database, and selects the recognized caller identifier based on the generated plurality of caller identifier choices and the retrieved one or more caller identifiers.

20. The system of claim 19, wherein the first location information comprises the telephone number from where the telephone call originated.

21. The system of claim 20, wherein the telephone number is received using automatic number identification.

22. The system of claim 19, wherein the processor determines a match between the generated plurality of caller identifier choices and the retrieved one or more caller identifiers, and selects the match as the recognized caller identifier.

23. The system of claim 19, wherein the processor assigns probabilities to the generated caller identifier choices, compares the generated caller identifier choices with the retrieved one or more caller identifiers, and modifies the probabilities based on the comparison.

* * * * *